United States Patent Office 3,236,801
Patented Feb. 22, 1966

3,236,801
ESTERS OF 1,2,3,4-CYCLOBUTANETETRACARBOXYLIC ACID AND PLASTIC COMPOSITIONS COMPRISING SAME
David Rhum, Westfield, Ronald C. Maggart, Kenilworth, and Robert Roper, Berkeley Heights, N.J., assignors to Esso Research and Engineering Company, a corporation of Delaware
No Drawing. Filed Jan. 30, 1963, Ser. No. 255,073
4 Claims. (Cl. 260—31.8)

This invention relates to a new class of materials which have been discovered to be particularly effective as plasticizers for resins and rubber-like materials. In particular, this invention relates to certain simple or mixed esters of 1,2,3,4-cyclobutanetetracarboxylic acid.

The ever-expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, and the copolymers of isobutylene with small amounts of a diolefin such as isoprene have created a large demand for suitable plasticizers. Alkyl esters and particularly di-2-ethylhexyl phthalate, di-isooctyl phthalate, di-n-octyl phthalate and tri-2-ethylhexyl phosphate have been shown to be acceptable plasticizers for the aforementioned high molecular weight materials and their use has become widespread throughout the industry. Since each of them, however, possesses definite shortcomings under certain service conditions, the industry is continually on the lookout for new and better plasticizers.

It is one object of this invention to provide the art with a new class of plasticized polymer having high permanence to plasticizer loss by volatilization. Another object is the production of plastic compositions having superior physical properties. Still other objects will appear from the subsequent description The properties of a plasticizer which are most important are compatibility, high plasticizing efficiency, and low volatility under conditions of use. It has previously been determined that polymeric-type plasticizers possess low volatility characteristics that make them highly desirable as commercial plasticizers. However, the polymerization processes involved in preparing such plasticizers are far more difficult to carry out then a simple esterification. It is one advantage of the present invention that it provides plasticizers which possess the desirable properties of polymeric-type plasticizers by simple esterification procedures Furthermore, when compared to other types of cyclic tetraesters the materials of this invention are endowed with superior low temperature characteristics. A further advantage of the esters of this invention is that they give a better compatibility-volatility relationship when compared with noncyclic tetraesters The compounds of the present invention which have been found to be particularly suitable for use as plasticizers are esters of 1,2,3,4-cyclobutanetetracarboxylic acid, the general formula of the ester being:

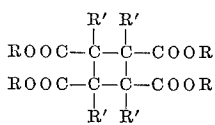

The groups R and R' may be the same or different, and are defined as follows to give the esters utilized in this invention.

$R=C_1-C_{16}$ alkyl group, e.g. derived from an alcohol obtained from the well-known Oxo process
or
$R=C_7-C_{15}$ aralkyl group, e.g. benzyl

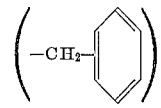

or
$R=C_6-C_{16}$ aromatic group, e.g. phenyl group

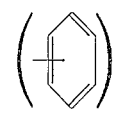

or substituted phenyl group

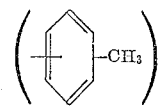

or
$R=C_3-C_{16}$ alicyclic group, e.g. cyclohexyl
or
$R=$ heterocyclic, e.g. tetrahydrofurfuryl
or
$R=C_2-CC_{16}$ alkoxyalkyl group, e.g. 2-methoxyethyl
and
$R'=H$ or a $C_1-C_{10}$ alkyl group The four R groups should contain a total number of C atoms in the range of 4–50. Liquid esters of $C_6-C_8$ oxo alcohols and mixtures thereof constitute one preferred embodiment of the invention The starting material in the preparation of the esters may be 1,2,3,4-cyclobutanetetracarboxylic acid, hereinafter referred to as CBA. CBA can be prepared by the photodimerization of maleic anhydride in the presence of ultraviolet light and subsequent hydrolysis. The CBA esters are prepared by direct esterification of the CBA with a monohydric alcohol Typical esterification techniques employing an acidic catalyst and an entrainer may be used. In addition CBA dianhydride or CBA tertacid chloride may be employed as the starting material instead of CBA using well-known techniques for carrying out the transformations Alternatively, the esters of this invention may be prepared by transesterification of a CBA ester, for example tetramethyl CBA, with a monohydric alcohol. The tetramethyl CBA can be derived by dimerization of dimethyl fumarate in the presence of ultraviolet light Conventional transesterification techniques employing a basic catalyst may be utilized.

The esters of this invention may also be prepared directly by dimerization of the appropriate dialkyl maleate or fumarate by means of ultraviolet light.

An illustrative example of the preparation of the esters of this invention is described in the following example.

*Example 1*

A mixture of 45 g. (0.156 mole) of tetramethyl CBA, 127.5 grams (1.248 moles) of oxo hexyl alcohol and 0.5 gram of sodium methylate was heated under nitrogen to about 140° C., whereupon methanol distilled from the mixture along with some of the oxo alcohol. When most of the methanol had been removed (determined by diluting the distillate with water), the solution was allowed to cool. After washing the reaction product with water, it was vacuum stripped to 150° C. at 0.05 mm. Hg to remove the excess oxo alcohol, leaving tetrahexyl CBA The effectiveness of the novel esters of this invention as plasticizers is shown in the examples below wherein a commercial polyvinyl chloride, known as Geon 101, was chosen as an illustrative material. A common barium-cadmium salt stabilizer was employed.

In preparing the test samples of the following examples, 100 parts of the resin were blended by hand with 2 parts of stabilizer and 50 parts of the indicated plasticizers to give a homogeneous blend. The blend was charged to a mill and further blended at a temperature of about 320° F. After mill mixing, the stock was sheeted off and molded under pressure at 340° F. to yield test pads measuring approximately 6 x 6 x 0.075 inch.

Mechanical properties including elongation were determined in the usual manner on a Scott Tester by pulling on dumbbell-shaped samples cut from the aforementioned molded pads with the rate of jaw separation being 20 inches per minute.

Heat aging characteristics were measured after long-range exposure of samples in an air circulating oven held at uniform temperature. The loss in plasticizer volatility was calculated from the change in weight of the dumbbell samples.

The torsional modulus was determined at various temperatures on strips of sample 0.25 inch thick with a Tinius Olsen torsion instrument. The Clash-Berg temperature was taken from a plot of torsional modulus vs. temperature. It is defined as the temperature at which the modulus is 135,000 p.s.i.

Plasticizer compatibility was measured by folding 0.5 x 4 inch samples into loops. These loops were placed in a two-plate steel clamp and clamped tightly 3/8 inch from the tip of the loop. After holding for 7 days, the folded samples were removed and the fold area was examined for drops of exuded plasticizer.

*Example 2*

Various simple and mixed esters of CBA were prepared in accordance with the procedure described in Example 1. These esters were mixed with polyvinyl chloride in a mill and subsequently molded to form test pads.

The esters were compared, as plasticizers, with a polyester based upon adipic acid and a glycol, and with a di-2-ethylhexyl phthalate. A comparison of the properties after oven aging is shown below:

|  | CBA Esters | | | Polyester | Di-2-ethyl-hexyl phthalate |
| --- | --- | --- | --- | --- | --- |
|  | Tetra-hexyl (oxo) | Dihexyl (oxo)-di-2-ethyl-hexyl | Tetra-2-ethyl-hexyl | | |
| Volatility upon Oven Aging: a Percent Plasticizer loss | 24 | 20 | 17 | 17 | 91 |
| Retention of Elongation after Oven Aging, Percent | 73 | 69 | 88 | 76 | 0 | a Conditions: 136° C., 7 days, airflow 400 ft./min.

This comparison shows that the plasticizers of this invention possess the low volatility and high retention of flexibility after oven aging that is characteristic of the polyester plasticizer. Furthermore, when compared with the oven aging properties of di-2-ethylhexyl phthalate, the plasticizers of the present invention exhibit far superior retentive characteristics.

*Example 3*

A comparison, similar to that of Example 2, was made between the CBA ester plasticizers of this invention and another cyclic tetraester plasticizer namely, tetra-n-amyl pyromellitate. The following results were obtained in a comparison of the low temperature properties of the two plasticizers.

|  | CBA Esters | | Tetra-n-amyl pyromellitate |
| --- | --- | --- | --- |
|  | Tetra-hexyl (oxo) | Dihexyl (oxo) di-2-ethyl hexyl | |
| Low Temperature Properties: Clash-Berg Temperature, ° C | −11.5 | −15.5 | −6.5 |

*Example 4*

A comparison, similar to that of Example 2, was made between the CBA ester plasticizers of this invention and a non-cyclic tetraester. The non-cyclic ester was a pentaerythritol fatty acid ester which is a commercial plasticizer. The results, as shown below, indicate that the CBA ester is superior in compatibility and volatility characteristics when compared to the fatty acid ester.

|  | Tetra-2-ethylhexyl CBA | Fatty Acid Ester of Pentaerythritol |
| --- | --- | --- |
| Compatibility: Exudation in loop test after 7 days | Light | Heavy |
| Volatility upon Oven Aging:a Percent Plasticizer Loss | 17 | 27 | a Conditions: 136° C., 7 days, airflow 400 ft./min.

*Example 5*

Samples of polymethyl methacrylate, polymethyl acrylate, cellulose acetate, cellulose propionate, ethyl cellulose and polystyrene are mixed on a plastic roller mill at elevated temperatures with 20 parts of tetraethyl CBA per 100 parts of each polymer. The resultant products are pressed into films and are found to be more flexible than each is found to be in the absence of the CBA plasticizer.

In summary, the invention relates to a novel group of esters and to their use as plasticizers for resin and rubber compositions. The plasticizer compound is used in proportions from about 5 to 150 parts, preferably 20 to 100 parts, per 100 parts of resin. In addition, the novel esters may be used alone with the resin or in combination with other plasticizers in varying proportions. With respect to the latter, of the total plasticizer in the formulation, 10 to 100 percent may consist of the CBA esters. The plasticizer esters of this invention may be mixed with a variety of thermoplastic materials, such as, for example, polyvinylchloride, polyvinylidene chloride, polyacrylic esters, polymethacrylic esters; cellulosic esters, such as cellulose acetate and cellulose propionate, polystyrene, cellulose ethers, such as ethyl cellulose, rubbery polymers, such as a butadiene-styrene copolymer, nitrile rubber, polyisobutylene and its copolymers, in conventional mixing equipment, such as plastic roller mills, Werner Pfleider mixers, Banbury mixers, by solution blending and mixing, dry mixing, and similar methods. It will be understood, of course, that in addition to the plasticizer, the polymer compositions may also contain 1 to 5 parts, per 100 parts of resin, of conventional stabilizers, such as basic lead carbonate, sodium borate or the like; oleic acid; softeners; fillers; pigments; and also curing agents, when the polymer is of the curable type.

The plastic compositions according to this invention may be used for the manufacture of various shaped articles. They may also be employed as sheeting, films, foams, foils, tapes, coatings and covering materials.

It will be understood that the foregoing examples have been given merely for purposes of illustration and that other modifications of the present invention are possible

What is claimed is:

1. A thermoplastic resinous composition comprising 100 parts of a thermoplastic resin and 5 to 150 parts of a plasticizer therefor having the general formula:

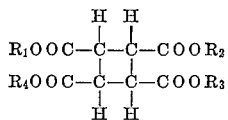

wherein the total number of carbon atoms in said plasticizer is within the range of 12 to 58 and $R_{1-4}$ are selected from the group consisting of $C_1$ to $C_{16}$ alkyl, $C_7$ to $C_{15}$ aralkyl, $C_2$ to $C_{16}$ alkoxyalkyl, $C_3$ to $C_{16}$ alicyclic, heterocyclic and $C_6$ to $C_{16}$ aromatic.

2. A thermoplastic resinous composition comprising 100 parts of polyvinyl chloride and 20 to 100 parts of a plasticizer therefor having the general formula:

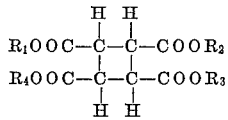

wherein the total number of carbon atoms in said plasticizer is within the range of 12 to 58 and $R_{1-4}$ are selected from the group consisting of $C_2$ to $C_{16}$ alkyl, $C_7$ to $C_{15}$ aralkyl, $C_2$ to $C_{16}$ alkoxyalkyl, $C_3$ to $C_{16}$ alicyclic, heterocyclic and $C_6$ to $C_{16}$ aromatic.

3. A thermoplastic resinous composition comprising 100 parts of polyvinyl chloride and 20 to 100 parts of a plasticizer having the general formula:

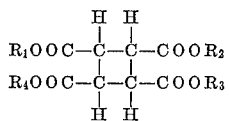

wherein the total number of carbon atoms in said plasticizer is within the range of 12 to 58 and $R_{1-4}$ are $C_1$ to $C_{16}$ alkyl groups.

4. The thermoplastic resinous composition of claim 3 wherein $R_{1-4}$ comprise $C_6$ to $C_8$ alkyl groups derived from oxo alcohols and mixtures thereof.

References Cited by the Examiner

Crieger: Chemische Berichte, 1960; vol. 93; pp. 2521–4; "Cyclobutane-1,2,3,4-Tetracarboxylic Acid."

Reid: Chemistry and Industry, 1953; pp. 846–7; "1,2,3,4-Cyclobutanetetracarboxylic Acid."

Griffin: Journal of the American Chemical Society, vol. 83; pp. 2725–8.

MORRIS LIEBMAN, *Primary Examiner.*